United States Patent
Dalcher et al.

(10) Patent No.: US 9,773,116 B2
(45) Date of Patent: *Sep. 26, 2017

(54) AUTOMATED LOCAL EXCEPTION RULE GENERATION SYSTEM, METHOD AND COMPUTER PROGRAM PRODUCT

(71) Applicant: McAfee, Inc., Santa Clara, CA (US)

(72) Inventors: Gregory William Dalcher, Tigard, OR (US); Hemang Satish Nadkarni, San Jose, CA (US)

(73) Assignee: McAfee, Inc., Santa Clara, CA (US)

(*) Notice: Subject to any disclaimer, the term of this patent is extended or adjusted under 35 U.S.C. 154(b) by 38 days.

This patent is subject to a terminal disclaimer.

(21) Appl. No.: 14/165,357

(22) Filed: Jan. 27, 2014

(65) Prior Publication Data

US 2014/0143829 A1    May 22, 2014

Related U.S. Application Data

(63) Continuation of application No. 11/313,591, filed on Dec. 21, 2005, now Pat. No. 8,646,025.

(51) Int. Cl.
| | | |
|---|---|---|
| *G06F 21/60* | (2013.01) | |
| *G06F 9/54* | (2006.01) | |
| *G06F 21/55* | (2013.01) | |
| *G06F 21/57* | (2013.01) | |
| *H04L 29/06* | (2006.01) | |

(52) U.S. Cl.
CPC ............. *G06F 21/60* (2013.01); *G06F 9/542* (2013.01); *G06F 21/55* (2013.01); *G06F 21/554* (2013.01); *G06F 21/577* (2013.01); *H04L 63/0263* (2013.01); *H04L 63/1425* (2013.01)

(58) Field of Classification Search
CPC ...... G06F 21/577; G06F 21/55; G06F 21/554; G06F 21/60; H04L 63/0263; H04L 63/1425
See application file for complete search history.

(56) References Cited

U.S. PATENT DOCUMENTS

| | | |
|---|---|---|
| 5,278,901 A | 1/1994 | Shieh et al. |
| 5,621,889 A | 4/1997 | Lermuzeaux et al. |
| 5,754,737 A | 5/1998 | Gipson |
| 5,826,250 A | 10/1998 | Trefler |
| 6,275,942 B1 | 8/2001 | Bernhard et al. |
| 6,347,374 B1 | 2/2002 | Drake et al. |
| 7,401,061 B2 * | 7/2008 | Law .................. G06N 5/02 706/47 |

(Continued)

OTHER PUBLICATIONS

J. E. Kerivan and K. Brothers, "Self-defending security software," MILCOM 2005—2005 IEEE Military Communications Conference, Atlantic City, NJ, 2005, pp. 3094-3103 vol. 5.*

(Continued)

*Primary Examiner* — Kari Schmidt
(74) *Attorney, Agent, or Firm* — Blank Rome, LLP

(57) ABSTRACT

A system, method and computer readable medium pertaining to evaluation of events from a computer system to assess security risks to that system. Events are evaluated according to the aspects of each event and the aspects are used to make a preliminary determination regarding violation of a security rule. In addition to a preliminary determination of a rule violation, exceptions to the rule may be identified.

14 Claims, 5 Drawing Sheets

(56) References Cited

U.S. PATENT DOCUMENTS

| | | |
|---|---|---|
| 8,646,025 B2 | 2/2014 | Dalcher et al. |
| 2002/0095322 A1 | 7/2002 | Zarefoss |
| 2003/0014466 A1 | 1/2003 | Berger et al. |
| 2003/0051026 A1 | 3/2003 | Carter et al. |
| 2003/0084323 A1 | 5/2003 | Gales |
| 2003/0145225 A1 | 7/2003 | Bruton, III et al. |
| 2003/0177389 A1 | 9/2003 | Albert et al. |
| 2004/0042470 A1 | 3/2004 | Cooper et al. |
| 2005/0028174 A1 | 2/2005 | Rossmann et al. |
| 2005/0080864 A1 | 4/2005 | Daniell |
| 2005/0157662 A1 | 7/2005 | Bingham et al. |
| 2005/0216956 A1 | 9/2005 | Orr et al. |
| 2005/0273418 A1* | 12/2005 | Campbell ............ G06Q 10/063 705/37 |
| 2005/0273850 A1 | 12/2005 | Freund |
| 2006/0004615 A1 | 1/2006 | Guldner et al. |
| 2006/0005227 A1 | 1/2006 | Samuelsson et al. |
| 2006/0010215 A1* | 1/2006 | Clegg ................. G06Q 10/107 709/206 |
| 2007/0094732 A1 | 4/2007 | Mood et al. |
| 2011/0023118 A1* | 1/2011 | Wright .................. G06F 11/28 726/23 |

OTHER PUBLICATIONS

Weimer, Westley, and George C. Necula. "Finding and preventing run-time error handling mistakes." ACM SIGPLAN Notices. (vol. 39. No. 10. pp. 419-431). ACM, 2004.*

Yiyu Yao, Fei-Yue Wang, D. Zeng and Jue Wang, "Rule+exception strategies for security information analysis," in IEEE Intelligent Systems, vol. 20, No. 5, pp. 52-57, Sep.-Oct. 2005.*

Office Action received for U.S. Appl. No. 11/313,591, dated Apr. 15, 2009, 13 Pages.

Office Action received for U.S. Appl. No. 11/313,591, dated Dec. 22, 2010, 15 Pages.

Office Action received for U.S. Appl. No. 11/313,591, dated Jun. 20, 2011, 11 Pages.

Office Action received for U.S. Appl. No. 11/313,591, dated Nov. 12, 2009, 18 Pages.

David Jackson, CESG EAL4 Study, Study Report, Sep. 22, 2004.

* cited by examiner

AUTOMATED LOCAL EXCEPTION RULE GENERATION SYSTEM, METHOD AND COMPUTER PROGRAM PRODUCT

FIELD OF THE INVENTION

The present invention relates to process exceptions, and more particularly to generating process exceptions.

BACKGROUND

An exception is a condition, often an error, which causes the program or microprocessor to branch to a different routine, and/or terminate. Performing some actions in response to the arising of an exception is called handling the exception. For example, exception handling in a C++ environment allows a detector of the exception to pass an error condition to code (e.g. an exception handler) that is prepared to handle the same.

Exceptions are relevant in a myriad of computing environments. For example, in a security program that monitors computer/network events for violation of a security rule, etc. such a rule may be found to be violated when, in reality, the event does not constitute a security threat. Such situation is often referred to as a false positive. In a general context, a false positive, also called a false alarm, exists when a test of any sort incorrectly reports that it has identified a situation where none exists in reality. Detection algorithms of all kinds often create false positives.

In order to address such false positives, an exception may be generated for each situation that would otherwise trigger a false positive. This process of creating exceptions to avoid false positives may be referred to as false positive tuning. False positive tuning can be an expensive task. Traditionally, a user is required to identify a program (such as a security program), collect events, and then manually create exceptions for an associated rule set to avoid creation of events that were deemed false positives.

There is thus a need for overcoming these and/or other problems associated with the prior art.

SUMMARY

A system, method and computer program product are provided for automatically generating a rule exception. An event is identified that at least potentially violates a rule. Thereafter, an exception to the rule is automatically generated.

DETAILED DESCRIPTION

Figure 1:
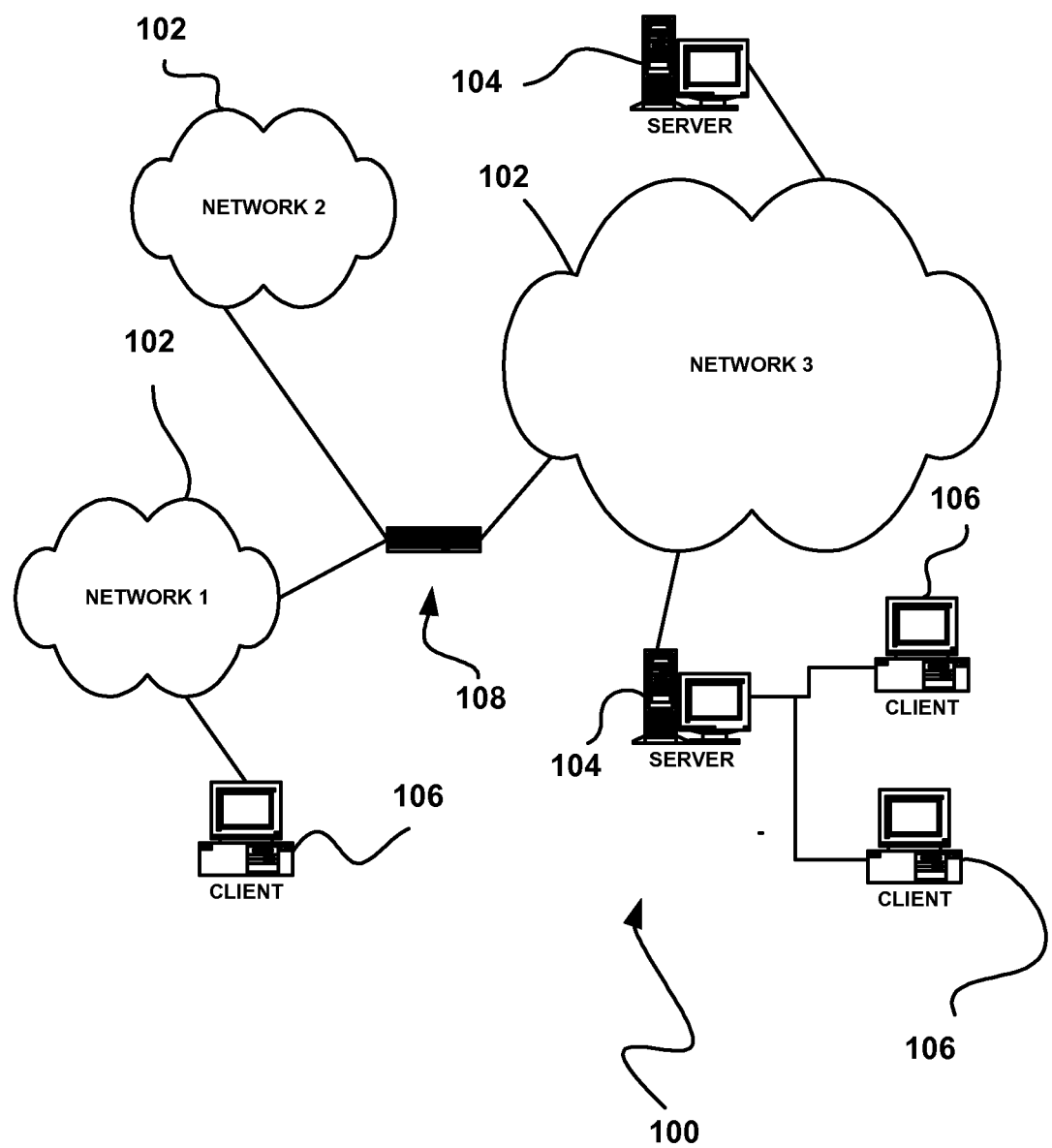
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

Figure 2:
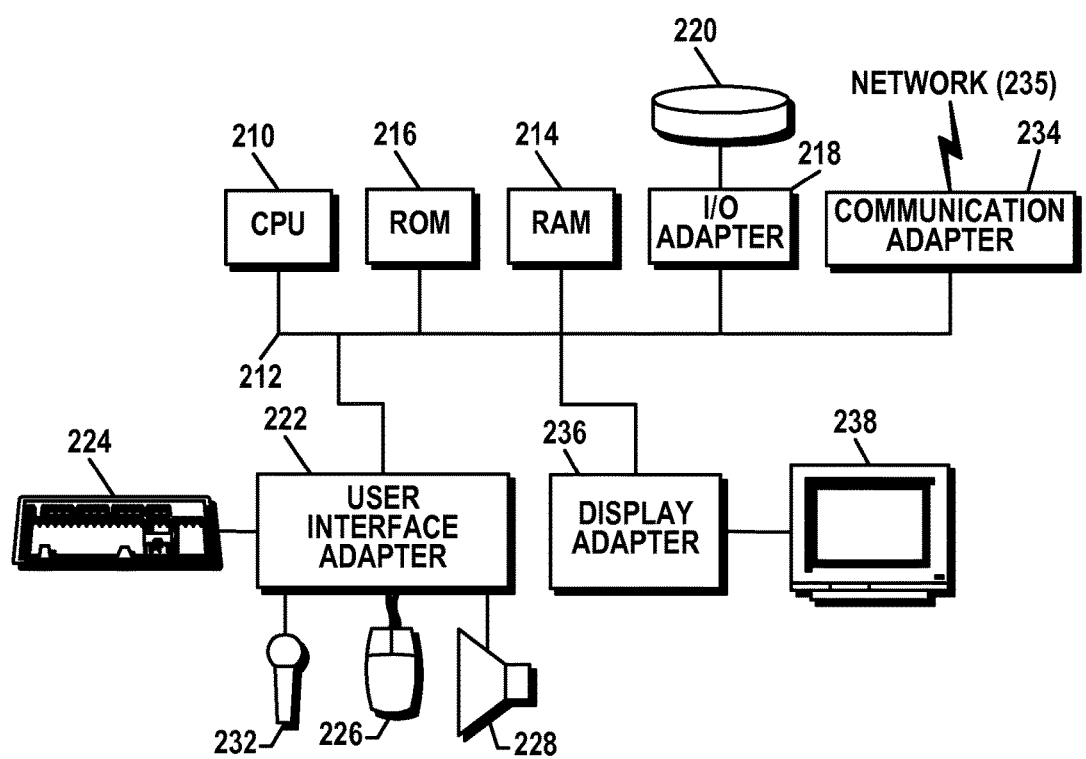
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
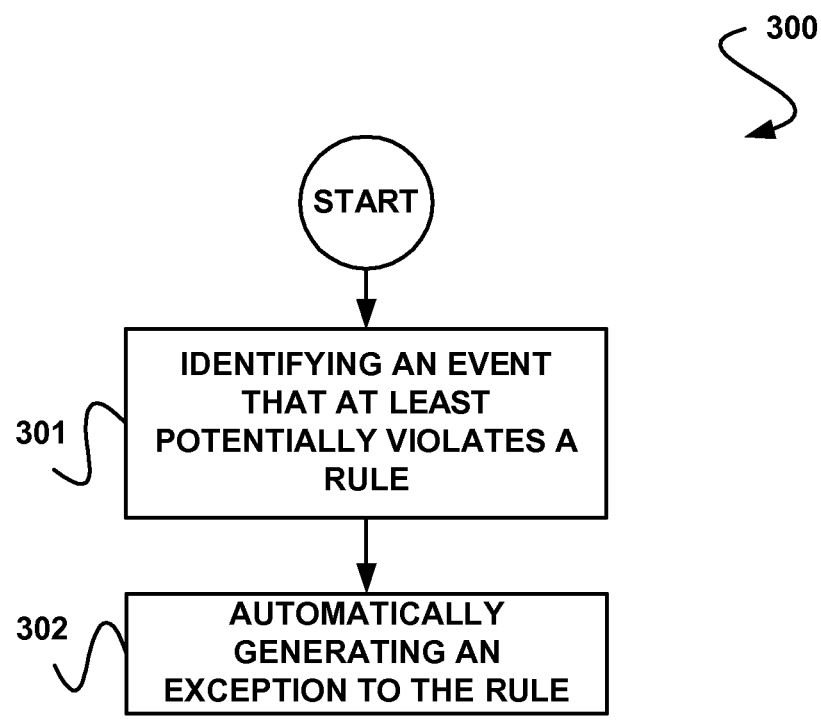
FIG. 3 shows a method for automatically generating a rule exception, in accordance with one embodiment.

FIG. 3 shows a method 300 for automatically generating a rule exception, in accordance with one embodiment. As an option, the method 300 may be implemented in the context of the architecture and environment of FIGS. 1 and/or 2. Of course, however, the method 300 may be carried out in any desired environment.

In operation 301, an event is identified that at least potentially violates a rule. In the context of the present description, an event may refer to any occurrence that may take place in the context of computer software and/or hardware that occurs with respect to any input, output, and/or computer processing. Still yet, a rule may refer to any entity that may be used to indicate whether an event should trigger a positive condition.

Thereafter, in operation 302, an exception to the rule is automatically generated. In the context of the preset description, an exception refers a condition, error, interrupt, instruction, operation, etc. that causes computer hardware and/or software to branch to a different routine, and/or terminate, when it would otherwise indicate the aforementioned positive condition. The automatic generation of the exception requires that at least the initiation or triggering of the rule exception generation process be automated, without manual input. To this end, a more efficient technique of generating exceptions is provided.

More illustrative information will now be set forth regarding various optional architectures and features with which the foregoing technique may or may not be implemented, per the desires of the user. Specifically, more information will be set forth regarding automated rule exception generation in the specific context of a security application (e.g. an intrusion detection system, etc.). It should be strongly noted that the following information is set forth for illustrative purposes and should not be construed as limiting in any manner. Any of the following features may be optionally incorporated with or without the exclusion of other features described in and out of a security-related context.

Figure 4:
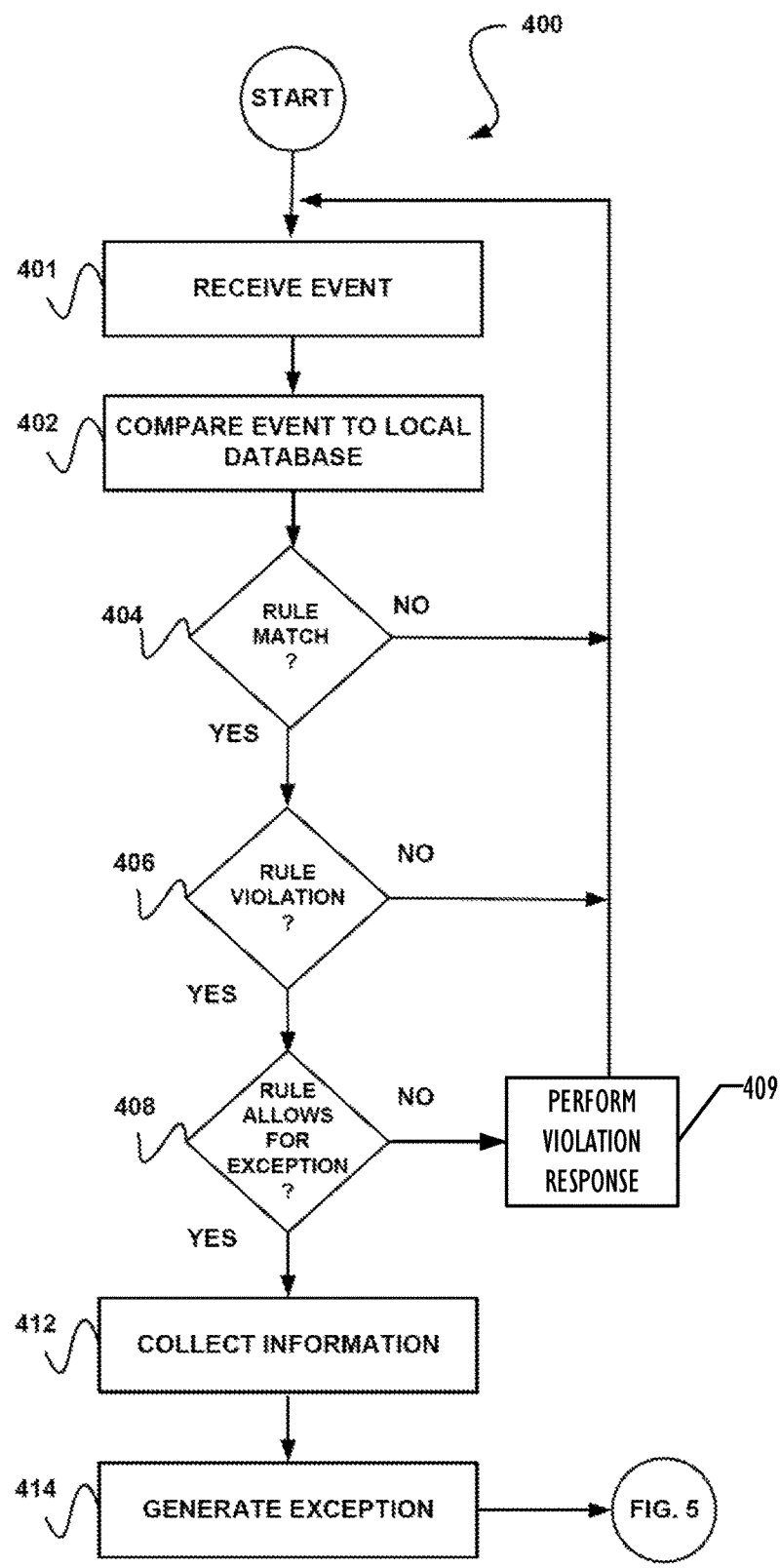
FIGS. 4 and 5 show a method for automatically generating rule exceptions in the context of a security application, in accordance with another embodiment.
Figure 5:
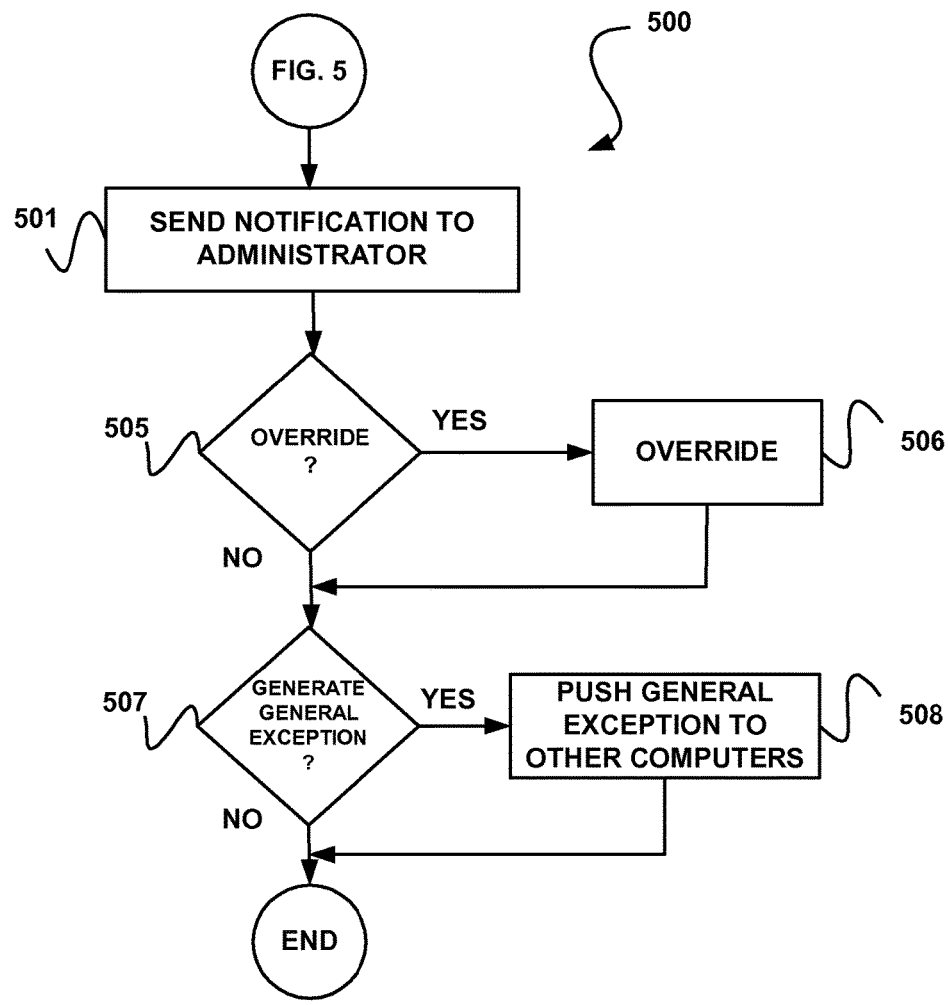

FIGS. 4 and 5 show a method 400 for automatically generating rule exceptions in the context of a security application, in accordance with another embodiment. As an option, the present method 400 may be implemented in the context of the architecture and environment of FIGS. 1 and/or 2. Of course, however, the method 400 may be carried out in any desired environment. Further, the aforementioned definitions may equally apply to the description below.

As shown, an event is first received in operation 401. In addition to the events set forth hereinabove during the description of the method 300 of FIG. 3, the events may include a buffer overflow event, an operation performed or to be performed on a file, an incoming and/or outgoing network communication, etc.

Next, in operation 402, the identified event may be compared to a database. Specifically, any aspect of the event may be compared to a list of entries in the database. Such aspects may include, but are not limited to, a user identifier, any aspect of an associated application program interface (API), a path, registry information, etc. Of course, the database may be a local or remote database that may be updated.

For reasons that will soon become apparent, each entry in the database includes, in addition to the aforementioned aspects, at least one rule and a tag indicating whether the rule allows for an exception. In the context of the present embodiment, such rule is capable of determining whether the event represents a security issue utilizing the associated aspect of the event. For example, each rule may include an intrusion detection rule that is capable of determining whether any aspect of the event represents an intrusion.

Table 1 illustrates an exemplary data structure that may be used as a database entry including a rule. It should be noted that such data structure is set forth for illustrative purposes only and should not be construed as limiting in any manner whatsoever.

TABLE 1

Rule Identifier
Aspect
Rule
Exception Tag

Thus, it is determined in decision 404 whether there is a match based on the comparison of operation 402. Resulting from decision 404 is a list of entries (each including a rule, etc.) that include rules that are capable of utilizing the matching aspect in order to determine whether there is a violation of the rule. As will soon become apparent, by parsing down the list of entries in such a manner, only rules that are relevant to the available aspects are identified, thus avoiding the application of irrelevant rules, for efficiency purposes.

Next, in decision 406, it is determined whether any of the matching rules are violated. To accomplish this, each rule may, in one embodiment, include an expression, definition, signature, wild card, etc. that may process the identified aspects of the event to determine whether or not the event represents a rule violation. Of course, this may be accomplished in any manner that indicates that the rule is at least potentially violated, as a function of the any identified aspect of the event. It should be noted that, if neither a rule match nor violation are identified in decisions 404 and 406, the method continues by receiving and comparing additional events.

If, on the other hand, a rule match and violation are identified in decisions 404 and 406, the method 400 continues by determining whether the matched/violated rule is capable of having an associated exception. Note decision 408. This may be accomplished, for example, by simply reviewing the exception tag mentioned hereinabove with respect to Table 1.

Of course, such tag may be automatically and/or manually included on a rule-by-rule basis based on whether the rule is known to be or capable of being subject to a false positive. This determination may be a function of a type of rule, or any other defining characteristic, etc. By only carrying out the subsequent operations on a limited subset of rules that are capable of exceptions, further efficiencies are provided.

If, per decision 408, it is determined that the matched/violated rule does not allow for automated exception generation, a response to the violation is carried out. Note operation 409. Such response may include, but is not limited to, notifying a user or administrator, blocking the event or underlying activity, reporting the event, or cleaning, deleting, and/or quarantining data/code associated with the event, etc. Of course, such response may include any passive and/or active response.

If, on the other hand, decision 408 indicates that the matched/violated rule does indeed allow for automated exception generation, the method 400 continues to the automated generation of an exception. This may be accomplished by collecting information associated with the event, as indicated in operation 412. Such information may include, but is not limited to a user identifier, rule identifier, any aspect of an associated application program interface (API), path, registry information, and/or any other aspect associated with an event event.

Utilizing such information, an exception is automatically generated, per operation 414. Similar to the aforementioned rules, each exception may, in one embodiment, include an expression, definition, signature, wild card, etc. that may process the identified aspects of the event to determine whether or not the event represents a rule exception. This may be accomplished in any manner that indicates that the expression is appropriate, as a function of the any identified aspect of the event.

By utilizing additional collected information that particularly describes the event, the exception is capable of being narrowly tailored to be invoked in the current specific instance. Of course, the more information that is collected and applied in the generation of the expression, the more narrowly tailored the exception will be, so that it is not invoked in any other unintended circumstance. Thus, the information may be used to limit a scope of the exception.

To this end, the exception may take the form of a database entry. Table 2 illustrates an exemplary data structure that may be used as a database entry including an exception. It should be noted that such data structure is set forth for illustrative purposes only and should not be construed as limiting in any manner whatsoever.

TABLE 2

Exception Identifier
Aspect
Exception

As shown, each exception entry does not have an exception tag, as it is not necessarily capable of having an associated exception.

By this design, during subsequent iterations of operations 401-406, exception entries may be matched in a manner that is similar to the rule entries. Further, if it is determined in decision 406 that, in addition to the rule, an associated exception applies (with a matching rule identifier, etc.), decision 406 may be answered in the negative, thus avoiding a violation response that would otherwise normally occur.

With reference now to FIG. 5, the present method 400 continues by sending a user (e.g. an administrator, etc.) a notification that the exception has been generated (operation 501). Next, in decision 505, it is determined whether the user desires to override the exception, such that it will not be included in an entry in the aforementioned database. If this is the case, the exception may be overridden. Optionally, such determination may be made with the help of a graphical user interface, etc. Further, such determination may further be made on an exception-by-exception basis in real time. In the alternative, the determination may be made as a function of predetermined filtering criteria provided by the user.

In one embodiment, the exception may apply only to a computer that is subject to the event. In other words, each computer is used to generate and apply a plurality of exceptions that are used only in association thereof. As an option, the user may be allowed to convert the exception to a general exception that is applies to computers other than that which is subject to the event. Note decision 507. If the user decides such, the general exception may be pushed to (or otherwise shared with) other computers so that such exception may be applied on such computers as well. This generalization and exception distribution may be carried out in any desired automated manner.

While not shown, a user may be given the option to disable any of the decisions/operations. For example, a user may disable the rule exception generation capability. Further, while not represented in the current diagrams, it should be noted that, in one embodiment, the various operations need not necessarily be carried out serially, but rather may be carried out independently in parallel.

Using the instant technique, intercepted events that would normally generate rule violations may instead generate exceptions to reduce the occurrence of future violation events (i.e. false positives, etc.).

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method of reducing false positive security violation responses comprising:
   receiving by a processor of a computer system a first information regarding a computer security event associated with an operation of a computer system;
   identifying, by the processor, a security rule of a collection of security rules, the security rule corresponding to the computer security event;
   determining, by the processor, whether automatic generation of exceptions to the security rule is allowed;
   generating, by the processor, a security violation response to the computer security event responsive to a determination that the security rule does not allow automatic generation of exceptions;
   creating, automatically by the processor, an exception to the security rule, responsive to a determination that the security rule allows automatic exception generation;
   offering a user an opportunity to exclude the exception from a database of rule exceptions;
   storing the exception as an entry in the database of rule exceptions; and
   using the stored exception to avoid a security violation response to a future computer security event.

2. The method of claim 1, wherein the collection of security rules resides in a database.

3. The method of claim 2, wherein the database is remotely located from the processor and memory.

4. The method of claim 1, wherein one or more rules from the collection of security rules comprises identification of a security related aspect and an indication regarding whether that aspect presents a security risk.

5. The method of claim 4, wherein the identified security related aspect presents a security risk and the identified security related aspect corresponds with tag information, the tag information providing an indication of preconditions for the security risk.

6. A non-transitory computer-readable medium on which are stored instructions for reducing false positive computer security responses, comprising instructions that when executed program a computer system to:
   receive a first information regarding a computer security event associated with an operation of the computer system;
   identify a security rule of a collection of security rules, the security rule corresponding to the computer security event;
   determine whether automatic generation of exceptions to the security rule is allowed;
   generate a security violation response to the computer security event responsive to a determination that the security rule does not allow automatic generations of exceptions;
   automatically create an exception to the security rule, responsive to a determination that the security rule allows automatic exception generation;
   offer a user an opportunity to exclude the exception from a database of rule exceptions;
   store the exception in the database of rule exceptions; and
   use the stored exception to avoid a security violation response to a future computer security event.

7. The computer readable medium of claim 6, wherein second information is a subset of first information.

8. The computer readable medium of claim 7, wherein first information is received over a network.

9. The computer-readable medium of claim 6, wherein one or more rules from the collection of rules comprises identification of a security related aspect and an indication regarding whether that aspect presents a security risk.

10. The computer readable medium of claim 6, wherein the first information includes a user identifier, information regarding a program interface, a path, or registry information.

11. A computer system programmed to reduce false positive computer security responses, comprising:
 a processor; and
 a memory, coupled to the processor, on which are stored instructions, comprising instructions that when executed cause the processor to:
  receive a first information regarding a computer security event associated with an operation of the computer system;
  identify a security rule of a collection of security rules, the security rule corresponding to the computer security event;
  determine whether automatic generation of exceptions to the security rule is allowed;
  generate a security violation response to the computer security event responsive to a determination that the security rule does not allow automatic generation of exceptions;
  automatically create an exception to the security rule responsive to a determination that the security rule allows automatic exception generation;
  offer a user an opportunity to exclude the exception from a database of rule exceptions;
  store the exception in the database of rule exceptions; and
  use the stored exception to avoid a security violation response to a future computer security event.

12. The computer system of claim 11, further comprising: a database that stores the collection of security rules.

13. The computer system of claim 11, wherein the instructions that when executed cause the processor to receive the first information comprise instructions that when executed cause the processor to receive the first information over a network connected to the computer system.

14. The computer system of claim 11, where an exception rule of the collection of exception rules comprises at least one of a user identifier, a path, or a registry information.

* * * * *